(12) United States Patent
Wang et al.

(10) Patent No.: US 9,232,343 B2
(45) Date of Patent: Jan. 5, 2016

(54) PLACING COMMANDS THROUGH CLOSE PROXIMITY COMMUNICATION TAPPING PATTERNS

(71) Applicant: XEROX CORPORATION, Norwalk, CT (US)

(72) Inventors: Michael H. Wang, Macedon, NY (US); Francis Kapo Tse, Rochester, NY (US); Gavan Leonard Tredoux, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 122 days.

(21) Appl. No.: 14/100,426

(22) Filed: Dec. 9, 2013

(65) Prior Publication Data

US 2015/0163621 A1    Jun. 11, 2015

(51) Int. Cl.
*H04B 7/00* (2006.01)
*H04W 4/00* (2009.01)

(52) U.S. Cl.
CPC ..................................... *H04W 4/008* (2013.01)

(58) Field of Classification Search
CPC .......... H04M 1/7253; H04M 2250/12; H04M 2250/64
USPC ..................... 455/41.3, 41.2, 41.1, 80, 151.2; 345/174, 173; 715/764, 863; 340/5.1, 340/5.51, 5.65
See application file for complete search history.

(56) References Cited

U.S. PATENT DOCUMENTS

| | | | |
|---|---|---|---|
| 8,638,190 B1 * | 1/2014 | Want et al. | 340/5.1 |
| 2010/0182270 A1 * | 7/2010 | Caliskan et al. | 345/174 |
| 2011/0072345 A1 * | 3/2011 | Lim | G06F 3/016 715/702 |
| 2012/0135687 A1 | 5/2012 | Thorn et al. | |
| 2012/0135689 A1 * | 5/2012 | Ko et al. | 455/67.11 |
| 2014/0176991 A1 * | 6/2014 | Yun | G06F 3/1292 358/1.15 |
| 2014/0230057 A1 * | 8/2014 | Berger | 726/23 |
| 2015/0019459 A1 * | 1/2015 | Han | 706/11 |
| 2015/0026613 A1 * | 1/2015 | Kwon et al. | 715/764 |

FOREIGN PATENT DOCUMENTS

| | | | |
|---|---|---|---|
| EP | 2302881 | 3/2011 | |
| EP | 2506203 | 10/2012 | |
| EP | 2620845 | 7/2013 | |
| WO | 2009105115 | 8/2009 | |
| WO | WO 2009/105115 | * 8/2009 | ............ H04W 88/04 |
| WO | 2013095591 | 6/2013 | |

* cited by examiner

Primary Examiner — Tan H Trinh
(74) Attorney, Agent, or Firm — Gibb & Riley, LLC

(57) ABSTRACT

A wireless communication device of a first device detects a pattern of taps made with a wireless communication device of a second device. A processor of the first device automatically interprets the pattern of taps as a command from a plurality of tap pattern-based commands. Functional elements of the first device automatically perform an operation corresponding to the command to fully execute the command based only on the pattern of taps. Each of the taps comprises the distance between the first device and the second device changing from a first distance to a second distance and returning to at least the first distance within a predetermined period of time, and the first distance is at least twice as large as the second distance. Also, different patterns of taps represent different commands of the tap pattern-based commands.

20 Claims, 4 Drawing Sheets

234

Smartphone Tapping Instructions (Tap Here):

1. Tap phone here twice quickly to print document currently displayed on phone;

2. Tap phone here twice slowly to scan a document;

3. Tap phone here three times quickly to copy a document; and

4. Tap phone here twice quickly, pause, and then tap three times slowly to scan document and send the document to your phone.

Smartphone Tapping Instructions (Tap Here):

1. Tap phone here twice quickly to print document currently displayed on phone;

2. Tap phone here twice slowly to scan a document;

3. Tap phone here three times quickly to copy a document; and

4. Tap phone here twice quickly, pause, and then tap three times slowly to scan document and send the document to your phone.

*FIG. 5*

PLACING COMMANDS THROUGH CLOSE PROXIMITY COMMUNICATION TAPPING PATTERNS

BACKGROUND

Systems and methods herein generally relate to moving devices to place commands and more particularly to using close proximity wireless communication devices to place commands.

Complex devices, such as multi-function printers (MFPs) can be confusing for a user to operate. A user may have to know many technical details about a device to use it, and the user may be required to navigate complicated menu structures on the device's relatively small and unsophisticated user interface to perform even basic functions. It is attractive to incorporate mobile devices to assist the user in making command placements to simplify the operations of such complex devices. For example, many mobile devices incorporate wireless communication "tags" such as NFC tags, but such wireless communication systems have limited bandwidth and portable devices may have limited storage capacity, which limit the ability of mobile devices to assist in command placement. Further, even if the complex device's menu can be replicated on the user's portable device, the menu options presented to the user may still be very complex and confusing requiring the user to employ many finger movements, slowing the user down and inconveniencing the user.

SUMMARY

Exemplary methods herein use a wireless communication device of a first device to detect a pattern of taps with a wireless communication device of a second device (such sensors can, for example, be near field communication (NFC) sensors). While the concept of an item being touched or tapped by another item is well-understood, for clarity herein, each of the "taps" occurs when a user causes the distance between the first device and the second device to change from a first distance to a second, closer distance and then return to at least the first distance within a predetermined period of time (where, for example, the first distance between the devices can be at least twice as large as the second, closer distance). The predetermined period of time can be, for example, less than 2 seconds and the second distance can be, for example, less than 2 cm.

Such methods use a processor to automatically interpret the pattern of taps as one distinct command from a plurality of tap pattern-based commands. For example, the tap pattern-based commands can include at least three different commands, and each of the different commands is selected by a different one of at least three different patterns of taps. Based only on the pattern of taps (and on no other user input) such methods then automatically perform an operation (that produces tangible output) corresponding to the command to fully execute the command using the first device.

With these methods, different patterns of taps represent different commands of the tap pattern-based commands. Further, the pattern of taps can include some taps of different lengths, and thus the taps in the tap pattern can comprise at least one short tap and at least one long tap. For example, the long tap can maintain the first device and the second device at the second, closer distance for a longer time period relative to the short tap (e.g., can maintain the first device and the second device at the second, closer distance for twice as long).

Devices herein comprise a first device that includes a wireless communication device detecting a pattern of taps made with a wireless communication device of a second device. The first device includes a processor operatively connected to the wireless communication device of the first device. The processor automatically interprets the pattern of taps as a command from the plurality of tap pattern-based commands. The first device further includes functional elements operatively connected to the processor, and such functional elements automatically perform an operation corresponding to the command to fully execute the command based only on the pattern of taps.

Thus, again, each of the taps comprises the distance between the first device and the second device changing from a first distance to a second distance and returning to at least the first distance within a predetermined period of time, and the first distance is at least twice as large as the second distance. Also, different patterns of taps represent different commands of the tap pattern-based commands.

Systems herein comprise a first device and a second device acting together. With such systems, wireless communication devices of the first device and the second device detect a pattern of taps of the first device and the second device. Processors of the first device and the second device automatically interpret the pattern of taps as a command from a plurality of tap pattern-based commands. Based only on the pattern of taps, the first device and the second device automatically perform an operation corresponding to the command to fully execute the command. Again, each of the taps comprises the distance between the first device and the second device changing from a first distance to a second distance and returning to at least the first distance within a predetermined period of time (the first distance is at least twice as large as the second distance and different patterns of taps represent different commands of the tap pattern-based commands).

These and other features are described in, or are apparent from, the following detailed description.

BRIEF DESCRIPTION OF THE DRAWINGS

Various exemplary systems and methods are described in detail below, with reference to the attached drawing figures, in which:

FIG. 5 is a schematic diagram illustrating instructions that can be utilized with methods, devices, and systems herein.

DETAILED DESCRIPTION

Figure 1:
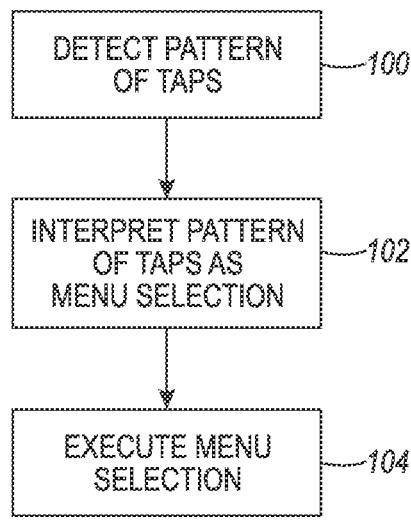
FIG. 1 is a flow diagram of various methods herein.

As mentioned above, complex devices often provide confusing menu hierarchies on smaller, less sophisticated user interfaces, and even if command placements for such complex devices can be made through a user's portable device, the user still needs to navigate the menu hierarchy and enter multiple menu selections or commands to even achieve simple operations that will eventually produce a tangible output.

Therefore, the systems and methods herein provide a repertoire of gestures involving the user and tags maintained within the user's mobile device. Such tags are wireless communication systems that only operate in close proximity, such as near field communication (NFC), radio frequency identification (RFID) tags, or equivalent (which may only operate within a range of 1 meter or substantially closer distances (such as actual contact, that occurs at "zero" distance or no distance).

Such tags often have very limited bandwidth and are therefore commonly limited to a single preset action, such as establishing communication between two devices. Different tags would be required to issue different commands in conventional systems. Rather than using such close proximity wireless communication systems to perform a single preset action per tag, the methods, devices, and systems herein use different touch gestures with the same tag to issue different commands, extending the usability of the touch-tag mechanism to include more functionality in a user friendly way. The specific touch gestures discussed below include physically moving the user's portable device toward and away from processing devices (in a tapping motion as the user's portable device taps the exterior of the processing device) as opposed to making selections through the graphic user interface (or other buttons or keys) of either the user's mobile device or the processing device that actually produces the tangible output. These gestures do not require finger action and can be given using one hand only, by holding a mobile phone or similar device.

In one specific example, with methods, devices, and systems herein, a user can approach and stand in front of a processing device, such as a printer. The user then taps or touches their mobile device (such as a smartphone, tablet, watch, portable digital assistant (PDA) or other hand-held computerized device) against the processing device at least twice to provide a pattern of taps to the complex processing device. Each different pattern of taps represents a different command placement that causes the complex processing device to perform a complete processing operation that results in tangible output.

In this process, the user touches the mobile device to the area of the complex processing device that contains the near field wireless communication device. Such tags are commonly included near (within a few cm of) the exterior of the complex processing device in a region that is easy for the user to reach; however such tags need not be fixed to the complex processing device, but may instead be placed on or near other devices or even locations such as walls (so long as the complex processing device or portable device can communicate with such tags).

The different pattern of taps or pattern of touches that can be used to make different command placements (different menu choices of many menu options) can be distinguished from one another by the number of times the user's mobile device is tapped against the complex processing device (and the tapping pattern). Alternatively, different forms of touching or tapping can be utilized, such as a single short touch, a long touch, or a combination of short and long touches to provide a larger repertoire of possible commands. The touches may be combined into composite commands by waiting for some short interval before considering the gesture complete. The notion of "long touch" may be engineered by rapidly reading the tag over very short intervals and inferring that the mobile has not been moved, and conversely for short touch.

For example, various commands or command placements can include, but are not limited to, (1) short touch: scan to my email account; (2) long touch: print the document currently being viewed on the mobile device; (3) short touch followed by a long touch: scan to email and place a copy in a local document repository; (4) long touch followed by a long touch: print the current document and charge it to my alternate budget center; etc.

Further, methods, devices and systems herein allow users to train the mobile device to associate tag touching gestures with specific commands or sequences of commands, effectively creating a programmable workflow with a very simple and easy to use interface that can be operated with one hand only, and without needing finger touches.

The methods, devices, and systems herein dramatically simplify the action that the user takes in order to provide a command, thereby saving time and reducing user annoyance and frustration. Further, such methods, devices, and systems allow users who suffer from various challenges in dexterity to use complex operating devices simply by making gross movements of touching their mobile device against the processing device. For example, users who have trouble seeing the small and sometimes poorly lit graphic user interfaces, or users who experience challenges in moving their fingers due to arthritis or other conditions find the gross movement of moving their mobile device up and down in a tapping or touching motion an easy way to provide commands. The scale of movements involved is suitable for the less agile, as no fine control is required.

FIG. 1 is a flowchart illustrating exemplary methods herein. In item 100, these methods use a wireless communication device of a first device to detect a pattern of taps with a wireless communication device of a second device (such sensors can, for example, can include, but are not limited to NFC sensors, RFID sensors, etc.).

While the concept of an item being tapped by another item is well-understood, for clarity herein, each of the "taps" occurs when a user causes the distance between the first device and the second device to change from a first distance to a second, closer distance and then return to at least the first distance within a predetermined period of time (where, for example, the first distance between the devices can be at least twice as large as the second, closer distance). In other words, a tap or touch occurs when the user brings a hand held portable computing device very close to or touching against another computing device, so close that they usually tap or touch the other computing device with theirs (although actual physical contact is not required, just a relative change in proximity). The wireless antennas of the close proximity wireless devices are usually located just under the cover of such devices, placing such antennas less than a few cm away from each other when the two devices are in physical contact during the touch or tap. The predetermined period of time can be, for example, less than 5 seconds (and will commonly be less than 1 second) and the second distance can be, for example, less than 10 cm (and will commonly by less than 1 cm (or zero)). Further, such a predetermined period of time and distance requirement is user adjustable through various setup options provided by the methods herein.

In item 102, such methods use a processor of either the first device or the second device to automatically interpret the pattern of taps as one distinct command from a plurality of possible tap pattern-based commands. For example, the tap pattern-based commands can include at least three different commands, and each of the different commands is selected by a different one of at least three different patterns of taps. Based only on the pattern of taps (and on no other user input) such methods then automatically perform an operation (that produces tangible output) corresponding to the command to fully execute all steps in the command using the first device in item 104.

Thus, with these methods, different patterns of taps represent different commands of the tap pattern-based commands. Further, the pattern of taps can include some taps of different lengths, and thus the taps in the tap pattern can comprise at least one short tap and at least one long tap. For example, the long tap can maintain the first device and the second device at the second, closer distance for a longer time period relative to the short tap (e.g., can maintain the first device and the second device at the second, closer distance for twice as long).

Figure 2:
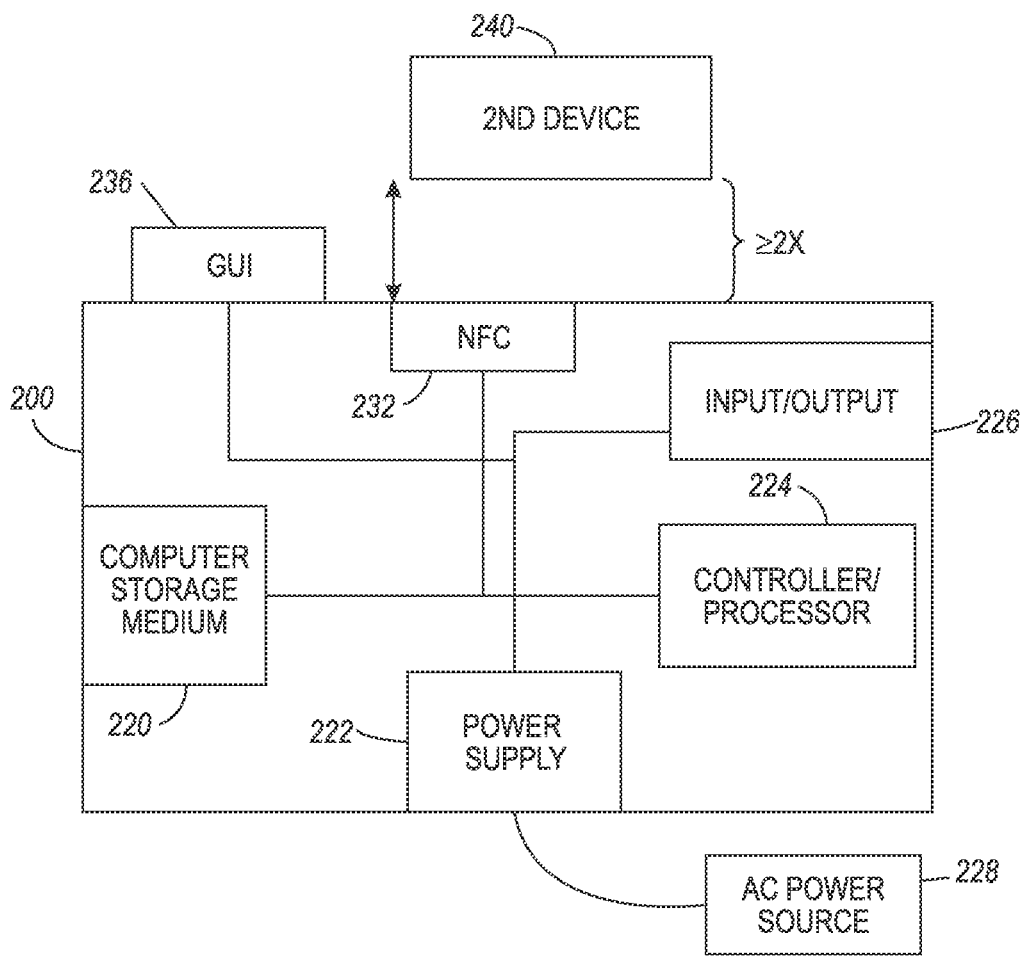
FIG. 2 is a schematic diagram illustrating devices and systems herein.
Figure 3:
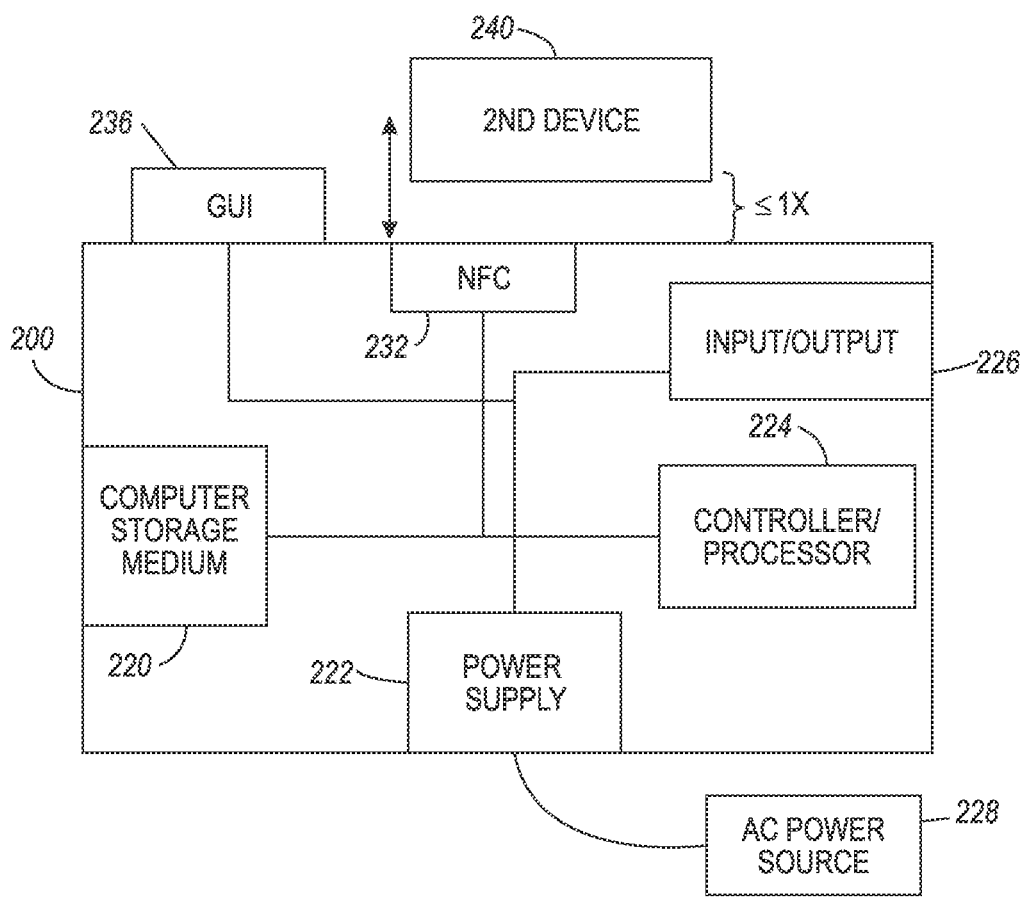
FIG. 3 is a schematic diagram illustrating devices and systems herein.
Figure 4:
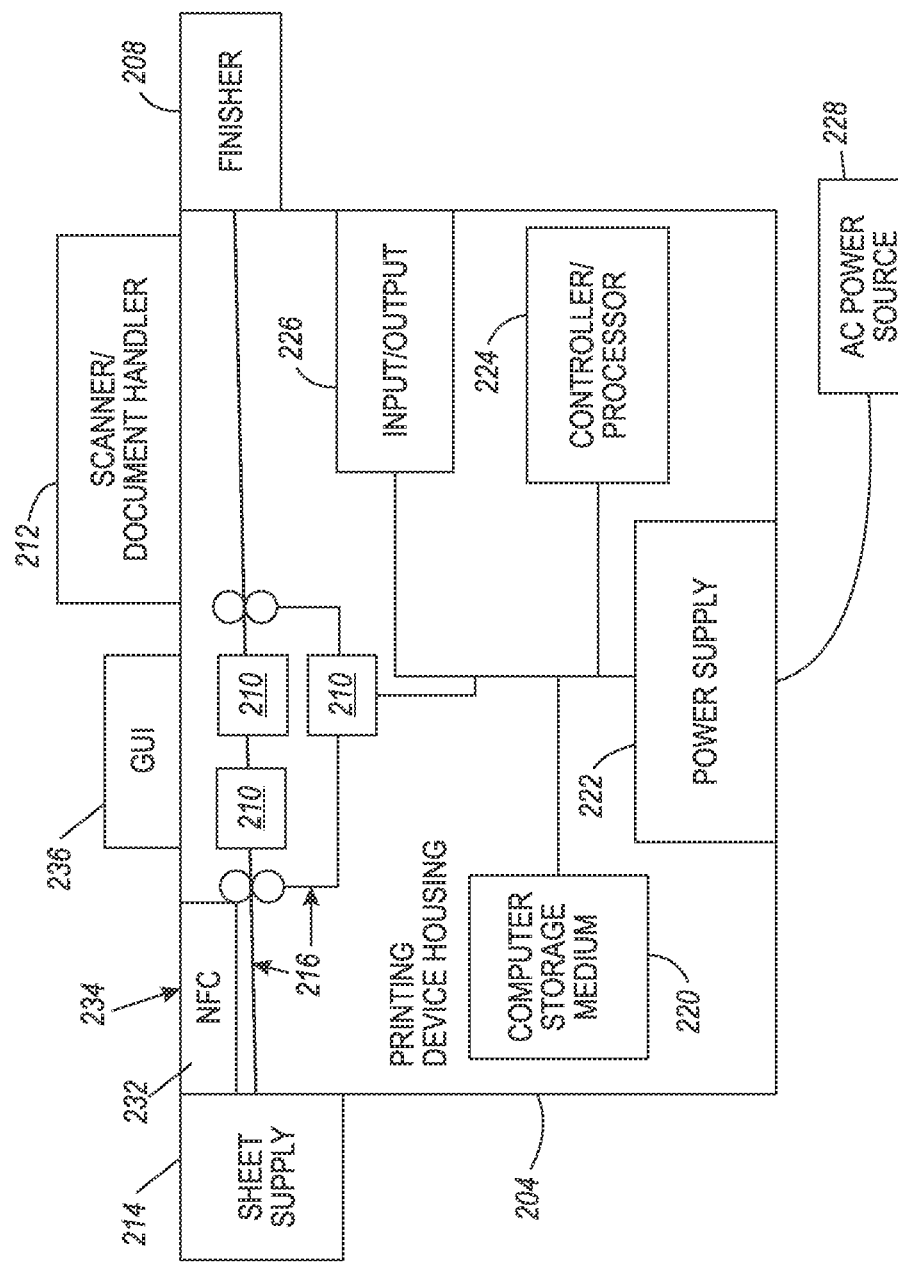
FIG. 4 is a schematic diagram illustrating devices and systems herein.

FIG. 2-4 present limited examples of devices herein. While some exemplary structures are illustrated in the attached drawings, those ordinarily skilled in the art would understand that the drawings are simplified schematic illustrations and that the claims presented below encompass many more (or potentially many less) features that are not illustrated, but that are commonly utilized with such devices and systems. Therefore, Applicants do not intend for the claims presented below to be limited by the attached drawings, but instead the attached drawings are merely provided to illustrate a few ways in which the claimed features can be implemented.

More specifically, FIG. 2 illustrates a computerized device 200, which can be used with systems and methods herein and can comprise, for example, a printing device, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 or wireless proximity communication device 232 (that is labeled in the drawings as an exemplary near field communication (NFC) device) that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Thus, as shown in FIG. 2, one exemplary "first" device 200 includes a wireless communication device 232 detecting a pattern of taps made with a wireless communication device of a "second" device 240. The second device 240 includes at least all the elements that are included in the first device 200; however, the details of the second device 240 are not illustrated to avoid clutter in the drawings. Further, while the first device 200 is shown as being physically larger than the second device 240, those ordinarily skilled in the art will understand that either device could be larger than the other or both devices could be the same size (e.g., both devices could be different smart phones).

Thus, both the first device 200 and the second device 240 include a processor 224 operatively connected to a wireless communication device 232. The processor 224 of the first device 200 or the second device 240 automatically interprets the pattern of taps with the second device 240 as a command from the plurality of tap pattern-based commands (discussed above).

As noted above, each of the taps occurs when a user causes the distance between the first device 200 and the second device 240 to change from a first distance to a second, closer distance and then return to at least the first distance within a predetermined period of time (by moving either device or both devices). FIG. 2 illustrates the "first" distance as being greater than or equal to 2×, while FIG. 3 illustrates the "second" distance as being less than or equal to 1×. In one non-limiting example the first distance can be 20 cm and the second distance can be 10 cm. In other examples, first distance can be 5 cm, and the second distance can be 0.1 cm. Thus, different implementations of the devices and systems herein can use different first and second distances and the specific measurements mentioned herein are only examples and are not limits. To the contrary, the methods, devices, and systems herein can work with any first and second distance that can be measured by technological devices (whether currently known or developed in the future). Therefore, in one generic example, the first distance between the devices can be at least twice as large, five times larger, ten times larger, etc., than the second, closer distance.

Further, such predetermined distances are user adjustable through various setup options provided by the devices and systems herein. For example, when setting user preferences of the methods, devices, and systems herein, users can explicitly specify the first and second distances through voice commands or manual inputs.

Thus, FIGS. 2 and 3 can be used in combination to illustrate the occurrence of a single "tap" where the devices 200, 240 move from the relative positions illustrated in FIG. 2 to the relative positions illustrated in FIG. 3, and then back to the relative positions illustrated in FIG. 2 (all within a predetermined period of time). The predetermined period of time can be, for example, less than 5 seconds (or some other time period, such as less than 1 minute, less than 3 seconds, less than 0.1 second, etc.). With embodiments herein multiple occurrences of such a single tap form a pattern of taps. Further, such predetermined time periods are user adjustable through various setup options provided by the devices and systems herein.

Additionally, users can train the methods, devices, and systems herein by performing a series of exemplary taps or touches (when setting user preferences) from which the methods, devices, and systems herein can "learn" the motion and timing that the user considers to be a tap or touch. Each user may have a unique concept of what constitutes a tap, and learning each user's "tap" makes the methods, systems, and devices herein very user friendly. The methods, devices, and systems can use changes in distance between the devices and/or G-force measurements to determine whether a valid tap or touch has occurred for a given user. Further, the distance, G-force, and timing measures of taps can be continually refined using a dynamic learning process that smoothes such measures over time (based on averages or other statistical measures) as the user makes additional taps or touches.

As shown in FIGS. 2 and 3, the first device 200 further includes functional elements (220, 224, 226, 236, etc.) operatively connected to the processor 224, and such functional elements automatically perform an operation corresponding to the command to fully and completely execute all steps in the command based only on the pattern of taps (and on no other user input is required to fully execute the command). Thus, an operation or workflow performed in response to such a single act of placing a command through a pattern of taps produces tangible output, such as printed sheets, items displayed on the graphic user interface 236, electronic items output through the input-output 226, etc. Therefore, the command involves multiple processes (and processing data) to achieve a tangible output and is more than just an initial step of establishing communications between devices.

As noted above, different patterns of taps represent different commands of many possible tap pattern-based commands. For example, the tap pattern-based commands can include at least three different commands, and each of the different commands is selected by a different one of at least three different patterns of taps. Thus, in this example, a first command can be made by tapping three times, a second command can be made by tapping four times, and a third command can be made by tapping five times. Further, the commands (or series of commands) that correspond to different tap patterns are user definable through various setup options provided by the devices and systems herein when setting user preferences.

In another example, the regularity of tapping within the pattern of taps can distinguish one pattern of taps from another pattern of taps, even if the same number of taps and same length of taps are included within the different patterns of taps. For example, one command can be made by tapping three times using a regular timing (one tap per second for three seconds); while a different command can be made by also tapping three taps using a different timing scheme (one tap per second for two seconds, followed by a pause for two seconds, followed by a single tap). Therefore, the patterns of taps are distinguished from one another not only by the number of taps, but also by the regularity of the timing of the taps with respect to each other.

Further, the pattern of taps can include some taps of different lengths, and thus the taps in the tap pattern can comprise at least one short tap and at least one long tap. For example, the long tap can maintain the first device and the second device at the second, closer distance for a longer time period relative to the short tap (e.g., can maintain the first device and the second device at the second, closer distance for twice as long, three times as long, 10 times as long, etc.). In addition, while a single "short tap" and a single "long tap" are mentioned in this example, many different lengths of taps can be utilized by the methods, devices, and systems herein to distinguish one pattern of taps from a different pattern of taps (so as to choose different commands). As noted above, what constitutes a short tap and a long tap can be learned by methods, devices, and systems herein (and refined over time) when setting user preferences.

Systems herein can comprise the first device 200 and the second device 240 illustrated in FIGS. 2 and 3 acting together. With such systems, wireless communication devices 232 of the first device 200 and the second device 240 detect a pattern of taps of (e.g., between or caused by) the first device 200 and the second device 240. Processors 224 of the first device 200 and the second device 240 automatically interpret the pattern of taps as a command from a plurality of tap pattern-based commands. Based only on the pattern of taps, the first device 200 and the second device 240 automatically act in concert to perform an operation corresponding to the command to fully execute the command (again without the need for any additional user input or action).

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

In the previous samples, no visual menu is displayed to the user before the user enters the pattern of taps that make the command placement. With methods, devices, and systems herein users are not necessarily provided visual menus of the commands corresponding to different tapping patterns as they will learn the same through learned patterns of tapping, as disclosed above. In addition, information on standard commands that are placed through different standardized patterns of tapping can included within the instructional material provided with such various devices herein.

As another feature, a specific device can include specific tapping instructions displayed on the exterior of the device (using, for example, a self-adhesive sticker with the tapping instructions printed thereon). In the example shown in FIG. 4, tapping instructions 234 are shown as being positioned directly above the wireless communication device 232 to allow such tapping instructions to be easily visible to the user standing in front of the printing device 204.

An example of what these tapping instructions 234 could display is shown in FIG. 5. More specifically, these exemplary tapping instructions 234 instruct the user that two quick taps will cause the document currently displayed on the user's phone to be immediately printed; two slow taps will cause the printing device 204 to perform a scan operation (of whatever item is currently on the platen); three quick taps will cause any item on the platen to be copied; and two quick taps followed by a pause and three slow taps will cause the item on the platen to be scanned and the image to be transferred to the users phone. As would be understood by those ordinarily skilled in the art, these menu choices or commands are only exemplary and many other menu choices could be presented to the user.

FIG. 5 also illustrates that a single pattern of tapping will start a complicated workflow. For example, command "1" in FIG. 5 causes the printing device 204 to establish communications with the user's phone, to download the document currently being displayed on the user's phone, to format the document for printing, and finally to print the document. All such actions are performed automatically once the user provides two quick taps, and the user does not need to take any additional action to establish communications, download the document, format the document, or print the document. Just the two taps causes all steps in this document printing process to occur automatically.

Similarly, command placement "4" in FIG. 5 causes the printing device 204 to scan the item that is on the platen, establish communications with the user's phone, format the image scanned so that it is compatible with the phone's display/storage capabilities, and finally transfer the formatted image to the user's phone. Again, all such steps occur after the user enters the pattern of taps that are described in menu choice "4" in the printed tapping instructions 234 shown in FIG. 5.

Many computerized devices are discussed above. Computerized devices that include chip-based central processing units (CPU's), input/output devices (including graphic user interfaces (GUI), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   detecting, by a wireless communication device of a multi-function printer, a pattern of taps made with a wireless communication device of a mobile device against said multi-function printer;
   automatically interpreting, by a processor, said pattern of taps as a command of a plurality of tap pattern-based commands; and
   based only on said pattern of taps, automatically performing, by said multi-function printer, an operation corresponding to said command to fully execute said command,
   each tap of said taps comprising a distance between said multi-function printer and said mobile device changing from a first distance to a second distance and returning to at least said first distance within a predetermined period of time;
   said first distance being at least twice as large as said second distance, and
   different patterns of taps of said mobile device against said multi-function printer each representing a different document printing or scanning workflow command of said tap pattern-based commands, performed by said multi-function printer.

2. The method according to claim 1, said operation producing tangible output.

3. The method according to claim 1, said predetermined period of time comprising less than 5 seconds and said second distance comprising less than 10 cm.

4. The method according to claim 1, said tap pattern-based commands comprising at least three different commands, each of said different commands being selected by a different one of at least three different patterns of taps.

5. The method according to claim 1, said wireless communication device of said first device and said wireless communication device of said second device comprising near field communication (NFC) sensor.

6. A method comprising:
   detecting, by a wireless communication device of a multi-function printer, a pattern of taps made with a wireless communication device of a mobile device against said multi-function printer;
   automatically interpreting, by a processor, said pattern of taps as a command of a plurality of tap pattern-based commands; and
   based only on said pattern of taps, automatically performing, by said multi-function printer, an operation corresponding to said command to fully execute said command,
   each tap of said taps comprising a distance between said multi-function printer and said mobile device changing from a first distance to a second distance and returning to at least said first distance within a predetermined period of time,
   said first distance being at least twice as large as said second distance,
   different patterns of taps of said mobile device against said multi-function printer each representing a different document printing or scanning workflow command of said tap pattern-based commands, performed by said multi-function printer,
   said pattern of taps comprising at least one short tap and at least one long tap, and
   said long tap maintaining said first device and said second device at said second distance for a longer time period relative to said short tap.

7. The method according to claim 6, said operation producing tangible output.

8. The method according to claim 6, said predetermined period of time comprising less than 5 seconds and said second distance comprising less than 10 cm.

9. The method according to claim 6, said tap pattern-based commands comprising at least three different commands, each of said different commands being selected by a different one of at least three different patterns of taps.

10. The method according to claim 6, said wireless communication device of said first device and said wireless communication device of said second device comprising near field communication (NFC) sensors.

11. A multi-function printer comprising:
    a wireless communication device detecting a pattern of taps made with a wireless communication device of a mobile device;
    a processor operatively connected to said wireless communication device of said multi-function printer, said processor automatically interpreting said pattern of taps as a command from a plurality of tap pattern-based commands; and functional elements operatively connected to said processor, said functional elements automatically performing an operation corresponding to said command to fully execute said command based only on said pattern of taps, each tap of said taps comprising a distance between said multi-function printer and said mobile device changing from a first distance to a second distance and returning to at least said first distance within a predetermined period of time, said first distance being at least twice as large as said second distance, and different patterns of taps of said mobile device against said multi-function printer each representing a different document printing or scanning workflow command of said tap pattern-based commands, performed by said functional elements.

12. The multi-function printer according to claim 11, said operation producing tangible output.

13. The multi-function printer according to claim 11, said predetermined period of time comprising less than 5 seconds and said second distance comprising less than 110 cm.

14. The multi-function printer according to claim 11, said tap pattern-based commands comprising at least three different commands, each of said different commands being selected by a different one of at least three different patterns of taps.

15. The multi-function printer according to claim 11, said wireless communication device of said first device and said wireless communication device of said second device comprising near field communication (NFC) sensors.

16. A system comprising:
a mobile device and a multi-function printer,
wireless communication devices of said mobile device and said multi-function printer detecting a pattern of taps of said mobile device against said multi-function printer, processors of said mobile device and said multi-function printer automatically interpreting said pattern of taps as a command from a plurality of tap pattern-based commands; and based only on said pattern of taps, said mobile device and said multi-function printer automatically performing an operation corresponding to said command to fully execute said command, each tap of said taps comprising a distance between said mobile device and said multi-function printer changing from a first distance to a second distance and returning to at least said first distance within a predetermined period of time, said first distance being at least twice as large as said second distance, and different patterns of taps of said mobile device against multi-function printer each representing a different document printing or scanning workflow command of said tap pattern-based commands, performed by said multi-function printer.

17. The system according to claim 16, said operation producing tangible output.

18. The system according to claim 16, said predetermined period of time comprising less than 5 seconds and said second distance comprising less than 10 cm.

19. The system according to claim 16, said tap pattern-based commands comprising at least three different commands, each of said different commands being selected by a different one of at least three different patterns of taps.

20. The system according to claim 16, said wireless communication devices comprising near field communication (NFC) sensors.

* * * * *